(12) United States Patent
Hildebrand et al.

(10) Patent No.: US 11,319,228 B2
(45) Date of Patent: May 3, 2022

(54) METHODS FOR INCREASING NITRIFYING BACTERIA BIOMASS IN A WASTE TREATMENT REACTOR SYSTEM

(71) Applicant: NEXOM, Winnipeg (CA)

(72) Inventors: Martin Hildebrand, Winnipeg (CA);
Merle Kroeker, Winnipeg (CA);
Tanner Devlin, Winnipeg (CA)

(73) Assignee: Nexom, Winnipeg (CA)

( * ) Notice: Subject to any disclaimer, the term of this patent is extended or adjusted under 35 U.S.C. 154(b) by 0 days.

(21) Appl. No.: 16/281,930

(22) Filed: Feb. 21, 2019

(65) Prior Publication Data

US 2020/0000540 A1 Jan. 2, 2020

Related U.S. Application Data

(60) Continuation-in-part of application No. 15/966,575, filed on Apr. 30, 2018, now Pat. No. 10,421,680, which is a division of application No. 15/683,945, filed on Aug. 23, 2017, now abandoned.

(60) Provisional application No. 62/535,523, filed on Jul. 21, 2017, provisional application No. 62/482,493, filed on Apr. 6, 2017, provisional application No. 62/378,897, filed on Aug. 24, 2016.

(51) Int. Cl.
*C02F 3/00* (2006.01)
*C02F 101/16* (2006.01)

(52) U.S. Cl.
CPC .......... *C02F 3/006* (2013.01); *C02F 2101/16* (2013.01); *C02F 2209/02* (2013.01)

(58) Field of Classification Search
CPC ... C02F 3/006; C02F 2101/16; C02F 2209/02

USPC ................................................. 210/614, 903
See application file for complete search history.

(56) References Cited

U.S. PATENT DOCUMENTS

| | | | | |
|---|---|---|---|---|
| 5,354,471 A | * | 10/1994 | Timpany | C02F 3/1263 210/607 |
| 2001/0027948 A1 | * | 10/2001 | Tipton | C02F 3/1242 210/629 |
| 2013/0277302 A1 | * | 10/2013 | Doelle | C02F 9/00 210/609 |

(Continued)

FOREIGN PATENT DOCUMENTS

CA 2729453 A1 * 7/2011 ................ C02F 3/06

*Primary Examiner* — Claire A Norris
(74) *Attorney, Agent, or Firm* — Michael R Williams; Ryan W Dupuis; Ade & Company Inc.

(57) ABSTRACT

Described herein are attached growth reactor systems which increase nitrifying bacteria biomass through a variety of means during warm weather. As a consequence, the attached growth reactor system contains sufficient nitrifying bacteria biomass to remove ammonia from wastewater in cold to moderate climates. In one example, there are two attached growth reactors into which wastewater is distributed discontinuously. Specifically, wastewater is transferred to the first attached growth reactor for a first period of time and then is transferred to the second attached growth reactor for a second period of time during warm weather which effectively doubles the nitrifying bacteria biomass in the system. During cold weather, wastewater can be applied to the reactors according to their increased nitrifying bacteria biomass, that is, according to their increased capacity to treat influent wastewater compared to standard operations.

9 Claims, 2 Drawing Sheets

(56) References Cited

U.S. PATENT DOCUMENTS

2014/0138308 A1* 5/2014 Eiger ..................... C02F 3/006
　　　　　　　　　　　　　　　　　　　　　　210/605

* cited by examiner

METHODS FOR INCREASING NITRIFYING BACTERIA BIOMASS IN A WASTE TREATMENT REACTOR SYSTEM

PRIOR APPLICATION INFORMATION

The instant application is a continuation-in-part of U.S. Ser. No. 15/966,575, entitled "MULTIPLE ATTACHED GROWTH REACTOR SYSTEM" and filed Apr. 30, 2018, now U.S. Pat. No. 10,421,680, the contents of which are incorporated herein by reference, which is a divisional application of U.S. Ser. No. 15/683,946, entitled "MULTIPLE ATTACHED GROWTH REACTOR SYSTEM" filed Aug. 23, 2017 and issued as U.S. Pat. No. 10,000,397 on Jun. 19, 2018, the contents of which are incorporated herein by reference, which claimed the benefit of: U.S. Provisional Patent Application Ser. No. 62/378,897, filed Aug. 24, 2016, entitled "DUAL SUBMERGED ATTACHED GROWTH REACTOR SYSTEM"; U.S. Provisional Patent Application Ser. No. 62/482,493, filed Apr. 6, 2017, entitled "DUAL SUBMERGED ATTACHED GROWTH REACTOR SYSTEM", the contents of which are incorporated herein by reference; and U.S. Provisional Patent Application Ser. No. 62/535,523, filed Jul. 21, 2017, entitled "MULTIPLE ATTACHED GROWTH REACTOR SYSTEM", the contents of which are incorporated herein by reference.

BACKGROUND

Compounds such as organic matter and nitrogen contained in wastewater are capable of being oxidized and transformed by bacteria which use these compounds as a food source. Typically, heterotrophic bacteria digest the organic matter while nitrifying bacteria use the non-organic compounds as a food source, for example, oxidizing ammonia to nitrate (a process known as nitrification to those skilled in the art).

In existing systems, for example as described by the US Environmental Protection Agency Manual on Nitrogen Control (USEPA, 1993); Wastewater Engineering, Treatment and Reuse, $4^{th}$ Edition (Metcalf and Eddy, 2003); Small and Decentralized Wastewater Management Systems (Crites and Tchobanoglous, 1998); and Design and Retrofit of Wastewater Treatment Plants for Biological Nutrient Removal (Randall et al., 1992), nitrifying bacteria are much more cold sensitive and as a consequence the nitrification process virtually ceases when the water temperature approaches (e.g., decreases towards) 4 degrees Celsius.

A common form of biological wastewater treatment is the sewage treatment lagoon and these lagoons typically discharge elevated levels of ammonia during winter months in regions in which the water temperatures approach 4 degrees Celsius or lower. In view of changing environmental regulations, it would be highly advantageous to develop biological treatment processes that could remove ammonia at water temperatures of less than 4 degrees Celsius.

In existing systems for removing pollution from water, a subsurface constructed wetland system may use forced bed aeration and variable water levels to establish staged anaerobic and aerobic zones within the system. While such systems may deliver oxygen to the wastewater via aeration in a system utilizing attached-growth bacteria for treatment, they cannot provide improved removal of ammonia at water temperatures approaching 4 degrees Celsius.

SUMMARY

As discussed herein and as will be apparent to one knowledgeable in the filed of wastewater treatment, sewage treatment systems are designed to treat a specific volume of wastewater over a given period of time. As discussed herein, that volume may be estimated or predicted based on knowledge of the area that the sewage treatment system is servicing as well as other factors such as the population size of the area, what percentage of the area is residential and the types of businesses within the service area. While the specific volume and/or ammonia content applied to the system overall and to parts thereof may vary considerably over a short period of time, over time, the average volume applied to the system by the users at a given time can be predicted based on for example previous usage patterns and in this context can be referred relatively consistent or constant.

Reference is made herein to "normal operations" or "standard operations" of the sewage treatment system. As will be apparent to one of skill in the art, this refers to raw wastewater entering the waste treatment system at the entry point of the sewage treatment system and passing through the sewage treatment system under normal or standard design conditions, that is, without transient or temporary supplementation and/or volume increases or decreases, as discussed herein. As is known by those of skill in the art, within a growth reactor, nitrifying bacteria use organic and inorganic compounds as a food source, for example, oxidizing ammonia to nitrate (nitrification). This process takes place only where there is sufficient ammonia and oxygen. In a growth reactor of a waste treatment system operating under standard conditions, nitrifying bacteria tend to grow where the food source is.

Described herein are a number of methods for increasing the biomass of nitrifying bacteria within a waste treatment system. As discussed below, in these methods, conditions within a given reactor are modified such that growth conditions for the nitrifying bacteria are improved and/or such that the biomass of the nitrifying bacteria within the given reactor increases compared to what it would have been under standard operations, that is, absent the intervention or modification for promoting nitrifying bacteria biomass growth and/or increase.

As discussed herein, the nitrifying bacteria biomass in a given growth reactor may be measured or it may be estimated. For example, the nitrifying bacteria biomass may be measured or estimated by determining the nitrification capacity within the specific reactor by measuring and/or monitoring the amount of ammonia entering and exiting the specific growth reactor, or by monitoring the nitrites and nitrates produced in the reactor. Alternatively, the nitrifying bacteria biomass may be estimated based on knowledge of the sewage treatment system and of the interventions carried out to increase the nitrifying bacteria biomass.

As discussed herein, an estimated or predicted nitrifying bacteria biomass may be used to estimate or predict the nitrification capacity of a given growth reactor under different conditions, for example, under different water temperatures. As discussed herein, this estimated or predicted nitrifying bacteria biomass may be used to determine what quantity of wastewater a specific growth reactor is capable of treating.

According to a first aspect, there is provided a method of improving ammonia removal from waste water during cold weather including:

in a sewage treatment system including at least two attached growth reactors, each respective attached growth reactor having an inlet distribution point in the attached growth reactor for receiving an influent of wastewater, during a warm weather period, transferring an approximately constant volume of the wastewater to the at least two attached growth reactors, wherein the volume is transferred such that a first attached growth reactor receives a larger portion of the volume than a second attached growth reactor for a first period of the warm weather period and the second attached growth reactor receives a larger portion of the volume than the first attached growth reactor for a second period of the warm weather period; and transferring the volume of wastewater to the first attached growth reactor and the second attached growth reactor approximately equally during a cold weather period.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors for the duration of the cold weather period.

That is, as discussed in greater detail below, during the intervention or modification within the sewage treatment system of transiently or temporarily increasing the volume of the wastewater entering a respective one of the growth reactors during the warm weather period, nitrifying bacteria within the respective one of the growth reactors are subjected to a higher quantity of ammonia than under standard or normal operations. This results in increased or improved growth conditions for the nitrifying bacteria which increases the nitrifying bacteria biomass compared to normal operations.

According to another aspect of the present disclosure, a system includes a first reactor, a second reactor, at least one inlet configured to transfer wastewater to the first reactor and the second reactor, and a flow control device. The flow control device is coupled to the at least one inlet. The flow control device is configured to operate in a first mode of operation during a first period of time and a second mode of operation during a second period of time. In the first mode of operation, the flow control device is configured to transfer more than half of the wastewater to the first reactor for a first duration via the at least one inlet, and subsequently transfer more than half of the wastewater to the second reactor for a second duration via the at least one inlet. In the second mode of operation, the flow control device is configured to transfer approximately half of the wastewater to the first reactor via the at least one inlet and simultaneously transfer approximately half of the wastewater to the second reactor via the at least one inlet.

According to another aspect of the present disclosure, a system includes a first reactor, a second reactor, at least one inlet configured to transfer wastewater to the first reactor and the second reactor, each reactor having an outlet for releasing treated wastewater or effluent and a flow control device. The flow control device is coupled to the outlet of the first reactor and to the outlet of the second reactor. The flow control device is configured to operate in a first mode of operation during a first period of time, a second mode of operation during a second period of time and a third mode of operation during a third period of time. In the first mode of operation, the flow control device is configured to prevent effluent or treated wastewater from exiting the system via the outlet of the first reactor while permitting exit of treated wastewater from the outlet of the second reactor. In the second mode of operation, the flow control device is configured to prevent effluent or treated wastewater from exiting the outlet of the second reactor while permitting exit of effluent from the outlet of the first reactor. In the third mode of operation, the flow control device is configured to permit exit of effluent from the outlet of the first reactor and the outlet of the second reactor.

According to another aspect of the present disclosure, there is provided a method for improving ammonia removal from wastewater during a cold weather period including: in a sewage treatment system including at least a first attached growth reactor and a second attached growth reactor, during a warm weather period, transferring a significant portion of wastewater to the first attached growth reactor for a first period of the warm weather period, then transferring a significant portion of the wastewater to the second attached growth reactor for a second period of the warm weather period; and during the cold weather period, transferring approximately half of the wastewater to the first attached growth reactor and approximately half of the wastewater to the second attached growth reactor.

As will be appreciated by one of skill in the art and as discussed herein, "transferring approximately half of the wastewater to the first attached growth reactor and approximately half of the wastewater to the second attached growth reactor" may refer to a specific moment in time (that is, that each reactor receives approximately half of the wastewater consistently during the cold weather period) or over the duration of the cold weather period (that is, at the end of the cold weather period, each reactor has received approximately half of the total volume of wastewater for the entire cold weather period).

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors during or during at least a portion of the cold weather period.

According to a further aspect of the present disclosure, there is provided a method of improving ammonia removal from waste water during a cold weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of a warm weather period and the second attached growth reactor receives a larger portion of the volume than the first attached growth reactor for a second period of the warm weather period on an alternating basis; and transferring the volume of wastewater to the first attached growth reactor and the second attached growth reactor approximately equally between the two attached growth reactors during the cold weather period.

As will be appreciated by one of skill in the art, providing each reactor with a larger portion of the wastewater for a period of time on an alternating basis increases the nitrifying bacteria biomass compared to what it would be with both reactors each receiving a constant volume during the warm weather period. During the cold weather period, each reactor has greater capacity to nitrify wastewater by virtue of the increased nitrifying bacteria biomass. While distributing approximately half of the waste to each reactor will result in most effective nitrification of the wastewater, this may not be necessary. For example, it may be that each reactor or at least one of the reactors has sufficient nitrifying bacteria biomass to nitrify greater than half of the wastewater, as discussed herein. Furthermore, over the course or duration of the cold weather period, each reactor may receive approximately half of the total volume of the wastewater. This may be done by continuously transferring approximately half of the volume to each reactor which it is believed will result in better performance or by transferring substantially all of the volume to one reactor and taking the effluent from the first reactor and transferring substantially all of the volume to the influent of the second reactor.

According to a further aspect of the present disclosure, there is provided a method of improving ammonia removal from waste water during a cold weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of a warm weather period and the second attached growth reactor receives a larger portion of the volume than the first attached growth reactor for a second period of the warm weather period on an alternating basis; and, during a cold weather period, transferring the volume of wastewater to the first attached growth reactor, recovering effluent from the first attached growth reactor and transferring the effluent from the first attached growth reactor to the second attached growth reactor.

According to yet another aspect of the present disclosure, there is provided a method of increasing nitrifying bacteria biomass in an attached growth reactor during a warm weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of the warm weather period and the second attached growth reactor receives a larger portion of the volume than the first attached growth reactor for a second period of the warm weather period on an alternating basis.

According to a still further aspect of the present disclosure, there is provided a method for improving ammonia removal from wastewater during a cold weather period including: in a sewage treatment system including an attached growth reactor separated into at least a first attached growth reactor chamber and a second attached growth reactor chamber, during a warm weather period, transferring a significant portion of wastewater to the first attached growth reactor chamber for a first period of the warm weather period, then transferring a significant portion of the wastewater to the second attached growth reactor chamber for a second period of the warm weather period; and during the cold weather period, transferring approximately half of the wastewater to the first attached growth reactor chamber and approximately half of the wastewater to the second attached growth reactor chamber.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass, that is, according to the ability of the nitrifying bacteria biomass to treat the incoming wastewater under expected conditions, for example, projected weather conditions and/or projected water temperatures, within the specific one of the growth reactors during or during at least a portion of the cold weather period.

According to another aspect of the present disclosure, there is provided a method of aeration or oxygenation for increasing nitrifying bacteria biomass within a wastewater treatment system including: in an attached growth reactor including a plurality of stationary fixed media for supporting biomass growth, at least two of said plurality of stationary fixed media including at least one oxygen intake port for receiving air or oxygen and at least one aeration or oxygen dispersion port connected to the respective oxygen intake port for dispersing oxygen into the reactor, connecting the at least two of said plurality of stationary fixed media to an aeration source via the respective at least one oxygen intake port; and supplying air or oxygen to a first one of the at least two of the plurality of stationary fixed media for a first period of time, and then supplying air or oxygen to a second one of the at least two of the plurality of stationary fixed media for a second period of time.

According to another aspect of the present disclosure, there is provided a method of aeration or oxygenation for increasing nitrifying bacteria biomass within a wastewater treatment system: including at least a first attached growth reactor and a second attached growth reactor, said first attached growth reactor being connected to the second attached growth reactor such that treated effluent from the first attached growth reactor is transferred to the second attached growth reactor, each growth reactor including a plurality of media for supporting bacterial biomass growth and each attached growth reactor including at least one oxygen or air intake port for supplying air or oxygen to the respective growth reactor, during a first period of time, supplying oxygen to the first reactor at a first level and during a second period of time, reducing air or oxygen supplied to the first reactor to a second level while supplying oxygen or air to the second reactor.

As will be appreciated by one of skill in the art, the second level of aeration and/or oxygenation is such that treatment of the wastewater within the first reactor is reduced to an extent such that ammonia passes from the first reactor to the second reactor for nitrification in the second reactor which in turn promotes an increase in nitrifying bacteria biomass within the second reactor. It is of note that the second level can be determined through routine experimentation or may be estimated based on knowledge of the operating conditions of the sewage treatment systems.

In some embodiments, the first period of time and the second period of time are during a warm weather period as described herein.

In some embodiments, the media for supporting bacterial biomass growth is stationary media.

According to another aspect of the present disclosure, there is provided a method for aeration or oxygenation or for increasing nitrifying bacteria biomass within a wastewater treatment system including: in an attached growth reactor including a plurality of stationary fixed media for supporting biomass growth, at least two of said plurality of stationary fixed media including at least one oxygen port dedicated to providing oxygen to said stationary media and supplying air or oxygen to at least the first one of the at least two units or groups of units of stationary media for a first period of time, and then supplying air or oxygen to a second one of the at least two of the plurality of stationary fixed media for a second period of time.

As discussed herein, by turning on the oxygen to a respective one stationary fixed media, growth of nitrifying bacteria on that specific stationary fixed media is promoted during this oxygenation period. As will be appreciated by one of skill in the art, aeration at all of the stationary fixed media simultaneously would lead to growth of nitrifying bacteria at only those respective stationary fixed media close enough to the inlet of the growth reactor, that is, to the food source for the bacteria, to receive ammonia. However, by alternating the location of the aeration or oxygenation, nitrifying bacteria growth is promoted at all aerated stationary fixed media.

According to another aspect of the present disclosure, there is provided a method for increasing nitrifying bacteria biomass in an attached growth reactor including: providing an attached growth reactor system having a first end region and a second end region wherein the first end region and the second end region are both capable of acting as an inlet or an outlet; during a warm weather period, transferring a volume of wastewater into the attached growth reactor at the first end region and removing treated wastewater from the reactor at the second end region for a first period of the warm weather period, then transferring the volume of wastewater into the attached growth reactor via the second end region and removing treated from the reactor at the first end region for a second period of the warm weather period on an alternating basis.

According to still another aspect of the present disclosure, there is provided a method for increasing nitrifying bacteria biomass including: in an attached growth reactor including a plurality of stationary fixed media for supporting biomass growth, said attached growth reactor having an inlet region for accepting wastewater and an outlet region, said wastewater having a direction of flow through the reactor from the inlet region to the outlet region, each respective one of the plurality of stationary fixed media being positioned within the reactor sequentially from the inlet region to the outlet region, periodically removing a respective one stationary fixed medium proximal to the inlet region and placing said respective one stationary fixed medium more distal to the inlet region.

According to another aspect of the present disclosure, there is provided a method for increasing nitrifying bacteria biomass including: in an attached growth reactor system including at least a first attached growth reactor and a second attached growth reactor, each attached growth reactor including a plurality of moving media for supporting biomass growth thereon, the first attached growth reactor having an inlet region for accepting wastewater and the second attached growth reactor having an outlet region, said wastewater having a direction of flow through the attached growth reactor system from the inlet region to the outlet region, periodically removing moving media from the first attached growth reactor and transferring said moving media to the second attached growth reactor.

In some embodiments, during the warm weather period, substantially all of the wastewater is transferred to the first attached growth reactor for a first period of time and subsequently all of the wastewater is transferred to the second attached growth reactor for a second period of time.

According to another aspect, there is provided a method of improving ammonia removal from waste water during cold weather including:

in a sewage treatment system including at least two attached growth reactors, each respective attached growth reactor having an inlet distribution point in the attached growth reactor for receiving an influent of wastewater, during a warm weather period, transferring an approximately constant volume of the wastewater to the at least two attached growth reactors, wherein the volume is transferred such that a first attached growth reactor receives a larger portion of the volume than a second attached growth reactor for a first period of the warm weather period and the second attached growth reactor receives a larger portion of the volume than the first attached growth reactor for a second period of the warm weather period; and transferring substantially more than half, for example 60-100% the volume of wastewater to the first attached growth reactor and the remaining volume of wastewater to second attached growth reactor during a cold weather period.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors during at least a portion of or during the cold weather period. As will be apparent, in these embodiments, one reactor may receive substantially more than half of the wastewater during the cold weather period, provided that the nitrifying bacteria biomass is sufficient to treat the wastewater, as discussed herein.

According to another aspect of the present disclosure, a system includes a first reactor, a second reactor, at least one inlet configured to transfer wastewater to the first reactor and the second reactor, and a flow control device. The flow control device is coupled to the at least one inlet. The flow control device is configured to operate in a first mode of operation during a first period of time and a second mode of operation during a second period of time. In the first mode of operation, the flow control device is configured to transfer more than half of the wastewater to the first reactor for a first duration via the at least one inlet, and subsequently transfer more than half of the wastewater to the second reactor for a second duration via the at least one inlet. In the second mode of operation, the flow control device is configured to transfer substantially more than half, for example 60-100% of the wastewater to the first reactor via the at least one inlet and simultaneously transfer the remaining wastewater to the second reactor via the at least one inlet.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors during at least a portion of or during the cold weather period.

According to another aspect of the present disclosure, there is provided a method for improving ammonia removal from wastewater during a cold weather period including: in a sewage treatment system including at least a first attached growth reactor and a second attached growth reactor, during a warm weather period, transferring a significant portion of wastewater to the first attached growth reactor for a first period of the warm weather period, then transferring a significant portion of the wastewater to the second attached growth reactor for a second period of the warm weather period; and during the cold weather period, transferring 0-100% of the wastewater to the first attached growth reactor and the remaining wastewater to the second attached growth reactor.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors during or during at least a portion of the cold weather period.

According to a further aspect of the present disclosure, there is provided a method of improving ammonia removal from waste water during a cold weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of a warm weather period and the second attached growth reactor receives a larger portion of the volume than the first attached growth reactor for a second period of the warm weather period on an alternating basis; and transferring 0-100% the volume of wastewater to the first attached growth reactor and transferring the remaining volume of wastewater to the second attached growth reactor during the cold weather period.

According to yet another aspect of the present disclosure, there is provided a method of increasing nitrifying bacteria biomass in an attached growth reactor during a warm weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of the warm weather period and the second attached growth reactor receives a larger portion of the volume than the first attached growth reactor for a second period of the warm weather period on an alternating basis.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors during or during at least a portion of the cold weather period.

According to a still further aspect of the present disclosure, there is provided a method for improving ammonia removal from wastewater during a cold weather period including: in a sewage treatment system including an attached growth reactor separated into at least a first attached growth reactor chamber and a second attached growth reactor chamber, during a warm weather period, transferring a significant portion of wastewater to the first attached growth reactor chamber for a first period of the warm weather period, then transferring a significant portion of the wastewater to the second attached growth reactor chamber for a second period of the warm weather period; and during the cold weather period, transferring 0-100% of the wastewater to the first attached growth reactor chamber and transferring the remaining wastewater to the second attached growth reactor chamber.

According to another aspect of the present disclosure, there is provided a method of aeration or oxygenation for increasing nitrifying bacteria biomass including: in an attached growth reactor including a plurality of media for supporting biomass growth, said reactor comprising at least two zones and each respective zone including at least one oxygen port for receiving air or oxygen and a plurality of aeration or oxygen dispersion ports connected to a respective oxygen port for dispersing air or oxygen into the respective zone, and supplying air or oxygen to a first respective zone or portion of reactor for a first period of time, and then supplying air or oxygen to a second respective zone for a second period of time.

In some embodiments, during the warm weather period, substantially all of the oxygen is transferred to the first attached growth reactor for a first period of time and subsequently all of the oxygen is transferred to the second attached growth reactor for a second period of time.

In other embodiments, oxygen is reduced in the first reactor for a period of time during the warm water period, causing ammonia to pass through the first reactor with a reduced rate of removal, increasing the ammonia entering the second reactor.

Alternatively, as discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors for the duration of the cold weather period.

According to another aspect, there is provided a method of increasing nitrifying bacteria biomass for improving ammonia removal from waste water during cold weather including:

in a sewage treatment system including at least one attached growth reactor for treating wastewater, said wastewater being applied to the reactor at an approximately consistent volume and consistent ammonia content over time, increasing the wastewater load by increasing the volume of wastewater and/or the ammonia content applied to the reactor for a period of time, thereby increasing nitrifying bacteria biomass within the reactor compared to standard operation of the sewage treatment system.

Preferably, the wastewater volume and/or ammonia content applied is increased during a warm weather period when nitrifying bacteria are capable of active growth.

At the end of the warm weather period, the nitrifying bacteria biomass within one of the growth reactors may be estimated and wastewater is transferred to the specific one of the growth reactors according to the estimated nitrifying bacteria biomass within the specific one of the growth reactors during or during at least a portion of the cold weather period.

According to another aspect of the present disclosure, there is provided a method of increasing nitrifying bacteria biomass for improving ammonia removal from wastewater during a cold weather period including: in a sewage treatment system including at least one attached growth reactor for treating wastewater, said wastewater being applied to the reactor at an approximately consistent volume and consistent ammonia content over time, during a warm weather period, the sewage treatment system treating influent wastewater in the reactor and producing effluent wastewater, recycling a portion of the effluent wastewater to a point of the sewage treatment system upstream of the reactor for a second period of time during the warm weather period, thereby increasing carbon and/or ammonia load and increasing nitrifying bacteria biomass in the reactor compared to standard operation of the reactor.

During the cold weather period, the attached growth reactor(s) treats influent wastewater and produces effluent wastewater without recycling effluent wastewater upstream or while recycling at a reduced rate.

According to another aspect of the present disclosure, there is provided a method of increasing nitrifying bacteria for improving ammonia removal from wastewater during a cold weather period including: in a sewage treatment system including at least one attached growth reactor for treating wastewater, said wastewater being applied to the reactor at an approximately consistent volume and consistent ammonia content over time, during a first period of the warm weather period, increasing a rate of wastewater flow through the reactor for example by displacing the wastewater containing ammonia using another water source, for example, water from another part of the sewage treatment system including but not limited to effluent from the nitrification reactor or other downstream treatment process to increase the loading in the attached growth reactor, and during cold water, the attached growth reactor(s) treats influent wastewater and produces effluent wastewater without supplementing the flow using an additional water source.

According to another aspect of the present disclosure, there is provided a method of increasing nitrifying bacteria biomass for improving ammonia removal from wastewater during a cold weather period including: in a sewage treatment system including at least one attached growth reactor, during a first period of the warm weather period, treating influent wastewater and producing effluent wastewater, and during a second period of the warm weather period, a portion of the wastewater stored within the system is combined with the influent wastewater to increase carbon and/or ammonia load.

During the cold weather period, the attached growth reactor(s) treats influent wastewater without the additional stored wastewater and produces effluent wastewater.

According to another aspect of the present disclosure, there is provided a method of increasing nitrifying bacteria biomass for improving ammonia removal from wastewater during a cold weather period including: in a sewage treatment system including at least one attached growth reactor for treating wastewater, said wastewater being applied to the reactor at an approximately consistent volume and consistent ammonia content over time, during a first period of the warm weather period, increasing the ammonia content of the waste water for example by reducing the treatment capacity of processes up-front of the attached growth reactor(s), thereby increasing carbon and/or ammonia load and increasing nitrifying bacteria biomass.

During the cold weather period, the attached growth reactor(s) treating influent wastewater and producing effluent wastewater without reduced treatment capacity up-front.

Herein, "to increase carbon and/or ammonia load" is used to describe the reason for chemically or physically increasing the wastewater load to the attached growth reactor(s) during the warm weather period. However, embodiments wherein other chemical or physical means are used to increase the carbon or ammonia load to the attached growth reactor(s) are to be understood as being possible and encompassed in all embodiments.

Herein, "a first attached growth reactor" and "a second growth reactor" are used in the singular. However, embodiments wherein there are multiple attached growth reactors, for example, two or more attached growth reactors, receiving an increased portion of wastewater intake are to be understood as being possible and encompassed in embodiments when only a single attached growth reactor is being referenced. For example, "a first attached growth reactor" may refer to more than one, for example, two, three, four or more attached growth reactors which are grouped together so as to effectively act as a single attached growth reactor.

Herein, "transferring approximately half of the wastewater to the first attached growth reactor chamber and approximately half of the wastewater to the second attached growth reactor chamber" and "transferring 60-100% of the wastewater to the first attached growth reactor chamber and transferring the remaining wastewater to the second attached growth reactor chamber" are used to describe the nature of wastewater supplied to the attached growth reactors. However, embodiments wherein multiple attached growth reactors, for example, two or more attached growth reactors, operate in parallel, series, and/or any combination are to be understood as being possible and encompassed in all embodiments.

DETAILED DESCRIPTION

Figure 1:
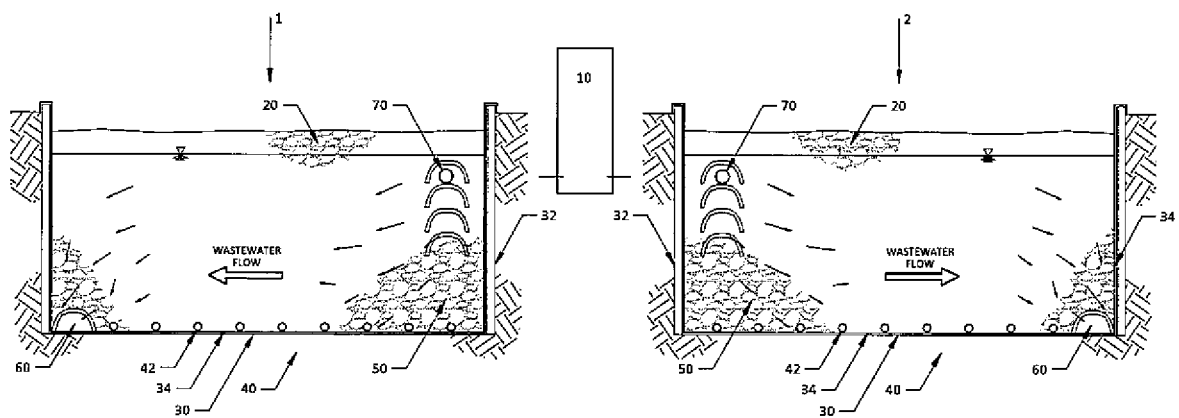
FIG. 1 is a schematic drawing of an embodiment of a sewage treatment system including two submerged attached growth reactors.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference for all purposes.

As used herein, 'heterotrophic bacteria' refers to bacteria capable of utilizing organic material. It is of note that generas of such bacteria are well known within the art and one of skill in the art will understand that this refers to specific bacteria of this type known to be present in for example treatment lagoons.

As used herein, nitrifying bacteria refers to any bacteria capable of oxidizing ammonia to nitrite, nitrite to nitrate, or ammonia to nitrate. It is of note that such bacteria are well known within the art and one of skill in the art will understand that this refers to specific bacteria of this type known to be present in for example treatment lagoons.

As used herein, "winter months" or "cold weather months" or "cold months" or "cold weather" refers to months or other durations of time in which the water temperature approaches or is less than 4 degrees Celsius, or is less than a threshold temperature corresponding to a threshold rate of bacteria activity (e.g., bacteria growth; nitrification). The water temperature may be the temperature of effluent water leaving the reactor or the temperature of wastewater (e.g., partially treated wastewater) in the reactor.

As used herein, "warm weather months" or "warm months" or "warm weather" refers to months or other durations of time in which the water temperature is typically considerably higher than 4 degrees Celsius (e.g., greater than or equal to 10 degrees Celsius, greater than or equal to 15 degrees Celsius). The distinction between warm weather and cold weather may correspond to a rate of bacteria growth in the reactor. For example, the rate of bacteria growth can increase as a function of temperature. At a first temperature (e.g., 4 degrees Celsius; between 2 degrees Celsius and 10 degrees Celsius; between 4 degrees Celsius and 7 degrees Celsius), the rate of bacteria growth may be less than a threshold rate sufficient to sustain the treatment processes desired for the reactors. At a second temperature (e.g., greater than or equal to 10 degrees Celsius), the rate of bacterial growth may be greater than or equal to the threshold rate.

Described herein is an attached growth reactor system which provides nitrification (ammonia removal) from wastewater in cold to moderate climates, specifically, during cold weather or cold weather months. Specifically, described herein are methods for increasing nitrifying bacteria biomass within the reactor(s) so that the sewage treatment system or wastewater treatment system has greater nitrifying bacteria biomass and/or greater nitrifying capacity during cold weather periods.

As discussed herein and as will be apparent to one knowledgeable in the field of wastewater treatment, sewage treatment systems are designed to treat a specific volume of wastewater over a given period of time. As discussed herein, that volume may be estimated or predicted based on knowledge of the area that the sewage treatment system is servicing as well as other factors such as the population size of the area, what percentage of the area is residential and the types of businesses within the service area as well as previous usage patterns. While the specific volume applied to the system may vary considerably over a short period of time, over time, the volume applied to the system by the users will generally follow predicted usage patterns and therefore can be referred to as being relatively consistent or constant.

Reference is made herein to "normal operations" or "standard operations" of the sewage treatment system. As will be apparent to one of skill in the art, this refers to raw wastewater entering the waste treatment system at the entry point of the sewage treatment system and passing through the sewage treatment system under normal or standard design conditions, that is, without transient or temporary supplementation and/or volume and/or content, for example, amounts of oxygen and/or ammonia, increases or decreases, as discussed herein.

As is known by those of skill in the art, within a growth reactor, nitrifying bacteria use organic and inorganic compounds as a food source, for example, oxidizing ammonia to nitrate (nitrification). This process takes place only where there is sufficient ammonia and oxygen. In a growth reactor of a waste treatment system operating under standard conditions, nitrifying bacteria tend to grow where there is available food.

As discussed herein, the nitrifying bacteria biomass in a given growth reactor may be measured or it may be estimated. For example, the nitrifying bacteria biomass may be measured or estimated by determining the nitrification capacity within the specific reactor by measuring and/or monitoring the amount of ammonia entering and exiting the specific growth reactor, or by measuring the nitrites and nitrates produced in the reactor. Alternatively, the nitrifying bacteria biomass may be estimated based on knowledge of the sewage treatment system and of the interventions carried out to increase the nitrifying bacteria biomass.

As discussed herein, an estimated or predicted nitrifying bacteria biomass may be used to estimate or predict the nitrification capacity of a given growth reactor under different conditions, for example, under different water temperatures. As discussed herein, this estimated or predicted nitrifying bacteria biomass may be used to determine what quantity of wastewater a specific growth reactor is capable of treating under specific conditions, for example, under given water temperatures.

In some embodiments, the attached growth reactor is a submerged attached growth reactor (SAGR), a moving media attached growth reactor (MMAGR) or a stationary media attached growth reactor (SMAGR). One example of an MMAGR is a Moving Bed Biofilm Reactor (MBBR), as discussed below. One example of a SMAGR is a stationary fixed film media attached growth reactor, as discussed below. However, as will be appreciated by one of skill in the art, any suitable growth reactor which receives an influent that undergoes bacterial nitrification during cold weather months can be used in combination with the present disclosure.

It is of note that there are many possible arrangements that will result in a reactor having a functionality similar to a SAGR, SMAGR or MBBR which will be readily apparent to one of skill in the art.

In some embodiments, the SAGR includes a media bed for example, a gravel or rock (or other similar material) bed with one or more horizontal chambers throughout. The chamber system is used to distribute the wastewater flow across the width of the cell, and a horizontal collection chamber at the outlet of the system is used to collect treated water. This distribution is desired to ensure horizontal flow throughout the gravel media and optimize hydraulic efficiency, although alternate (vertical) flow paths could achieve similar treatment results, and are contemplated by this invention. Linear aeration proximate to the bottom of the SAGR provides aerobic conditions that are required for nitrification. In some embodiments, the gravel bed may be covered with a layer of an insulating material, for example, peat or wood chips.

Figure 2:
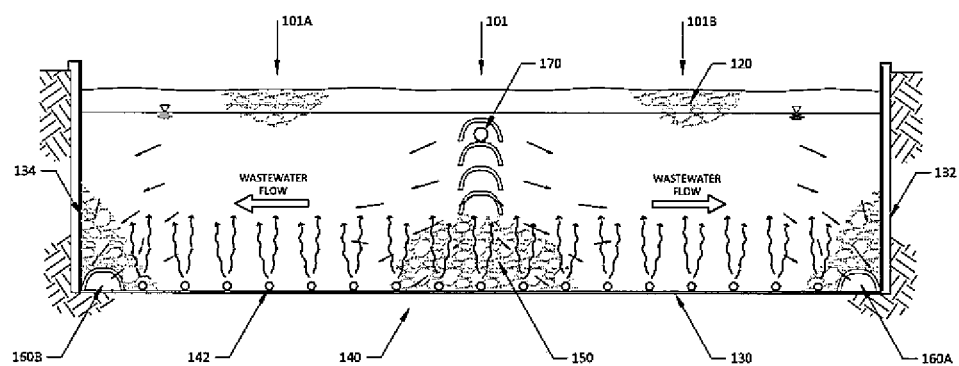
FIG. 2 is a schematic drawing of an embodiment of a sewage treatment system including two separate chambers within one reactor.

Two examples of submerged attached growth reactor systems are shown in FIGS. 1 and 2.

It is important to note that while these figures illustrate two embodiments of SAGR treatment systems, various features of these embodiments, including but not limited to distributing wastewater flow unequally between two or more reactors over time or otherwise increasing the biomass of nitrifying bacteria within one or more reactors and/or within one or more chambers of one reactor, may be applied to other attached growth reactor systems.

As compared to existing systems, systems and methods in accordance with embodiments of the present disclosure can increase nitrifying bacteria biomass within the attached growth reactor system so that there is increased nitrifying bacteria biomass to nitrify wastewater during a cold weather period of time (e.g., a cold weather period of time following a warm weather period of time in which wastewater is transferred unequally to reactors or reactor cells of the attached growth reactor system).

Referring now to FIG. 1, a sewage treatment system including a first reactor 1 (e.g., attached growth reactor) and a second reactor 2 (e.g., attached growth reactor) is shown according to an embodiment of the present disclosure. Each reactor 1,2 is defined by a base 30 and a plurality of walls 32, for example, three or four or more vertical or sloped walls. The walls 32 and the base 30 of each reactor 1, 2 are lined with a semi-impermeable or impermeable liner 34. The top of each reactor 1, 2 is defined by the level of wastewater (e.g., partially treated wastewater) with the respective reactor 1, 2. The top is covered with an insulation layer 20 that is on the upper surface of the wastewater in the reactor 1, 2. The insulation layer 20 may be of any suitable material as discussed herein and as known in the art, for example, wood chips, mulch, peat, shredded tires or the like. Any suitable material can act as insulation.

In some embodiments, the base 30 of each reactor 1, 2 includes an aeration system 40, media bed 50 and effluent collector 60. In some embodiments, the aeration system 40 includes a plurality of aeration diffusers 42 connected to an air or oxygen supply and spaced along the base 30 of the reactors 1, 2. In some embodiments, the aeration system is arranged such that the main aeration headers are accessible at the upper surface of the wastewater. In some embodiments, the aeration lines run perpendicular to the direction of wastewater flow through the reactor 1, 2 although in other embodiments the aeration lines run parallel to the direction of wastewater flow. In some embodiments, the aeration system 40 includes acid cleaning means for cleaning of the diffusers in situ.

As shown in FIG. 1, the media bed 50 can be placed over the aeration system 40 and may be any suitable material that will have pore spaces for air or oxygen generated by the aeration diffusers 42 at the base 30 of the of the reactor 1, 2 to pass through the material bed 50 so as to aerate the wastewater within the reactor 1, 2. As discussed herein, the media bed 50 may be composed of any suitable material, for example, any material that passes through a 1.5 inch screen such as suitably sized rocks or gravel, although other suitable materials will be readily apparent to one of skill in the art.

The effluent collector 60 is proximal to the base 30 in each reactor 1, 2. Treated wastewater is removed from the reactors 1, 2 via the effluent collector 60.

The reactors 1, 2 also include one or more inlets 70 for transferring of wastewater into the reactor system for treatment. In some embodiments, as shown in FIG. 1, the inlets 70 comprise stacked chambers for wastewater (e.g., influent wastewater) flow distribution. The inlets 70 may include flow distribution piping using orifices for flow control.

In some embodiments, the reactors 1, 2 are configured to receive wastewater based on operation of a flow control device 10 (e.g., a flow splitter device, a manifold, valve(s)). The flow control device 10 can be configured to receive wastewater and transfer the wastewater to one or both of the reactors 1, 2. The flow control device 10 can be configured to control a flow rate of wastewater being transferred to one or both of the reactors 1, 2. The flow control device 10 can be configured to receive the wastewater from a wastewater reservoir. In some embodiments, the flow control device 10 includes a flow splitter weir configured to split the wastewater to one or both of the reactors 1, 2. In some embodiments, the flow control device 10 includes one or more standpipes configured to split the wastewater to one or both of the reactors 1, 2. In some embodiments, the flow control device 10 is configured to split the wastewater to one or both of the reactors 1, 2 based on at least one of back-pressure or gravity. In some the flow control device includes one or more actively controlled valves configured to split the wastewater to one or both of the reactors 1, 2. In some embodiments, the flow control device 10 includes or is coupled to one or more effluent collectors 60, such as to control the rate of wastewater flow through one or both reactors 1, 2 by opening or closing valves of effluent collector(s) 60.

In some embodiments, such as can be seen from FIG. 1, each reactor 1, 2 is physically separate from the other and the flow control device 10 controls distribution to each reactor 1, 2. That is, flow control device 10 can control what percentage of the volume of incoming wastewater each reactor 1, 2 receives for treatment.

In some embodiments, the flow control device 10 is configured to operate in a plurality of modes. The flow control device 10 can operate in modes corresponding to a temperature of the wastewater to be transferred to the reactors 1, 2. For example, in a first mode of operation, the flow control device 10 can be configured to transfer more than half of the wastewater to the first reactor 1 for a first period of time (e.g., via inlet 70 coupled to the first reactor 1), and subsequently transfer more than half of the wastewater to the second reactor 2 for a second period of time (e.g., via inlet 70 coupled to the second reactor 2). The flow control device 10 can be configured to operate in the first mode of operation during a warm weather period of time. For example, the flow control device 10 can be configured to operate in the first mode of operation while a temperature of the wastewater is greater than a threshold temperature. The threshold temperature may be greater than 0.5 degrees Celsius and less than 10° Celsius. The threshold temperature may be greater than 2 degrees Celsius and less than 7 degrees Celsius. The threshold temperature may be 4 degrees Celsius. In a second mode of operation, the flow control device 10 can be configured to transfer approximately half (e.g., greater than or equal to 45 percent and less than or equal to 55 percent; greater than or equal to 48 percent and less than or equal to 52 percent, or greater than or equal to 40% and less than or equal to 60%, or greater than or equal to 35% and less than or equal to 65%)) of the wastewater to the first reactor 1 and simultaneously transfer approximately half of the wastewater (e.g., transfer the remainder of the wastewater) to the second reactor 2. The flow control device 10 can be configured to operate in the second mode of operation while the temperature of the wastewater is less than or equal to the threshold temperature.

As will be appreciated by one of skill in the art, the above-described distribution method will provide very effective nitrification of the wastewater. However, it is to be understood that the wastewater for nitrification may be allocated to the reactors based on estimated nitrifying bacteria biomass and/or nitrification capacity of the respective reactor, under expected, predicted or projected weather conditions and/or water temperatures, as discussed herein. Accordingly, in some embodiments, one reactor may have sufficient nitrifying capacity to treat greater than half for example much greater than half of incoming wastewater during cold weather periods. However, it is to be understood that in some embodiments the wastewater is distributed to the reactors such that each reactor receives approximately half of the wastewater as defined above over the duration of the cold weather period.

Referring now FIG. 2, a system including a single reactor 101 is shown according to an embodiment of the present disclosure. The reactor 101 can incorporate features of the reactors 1, 2 described with reference to FIG. 1. In some embodiments, the reactor 101 includes a base 130 and three or more vertical walls 132 lined with a semi-permeable or impermeable liner 134. The top of the reactor 101 is defined by the level of wastewater in the reactor 101 and is covered by an insulating layer 120 as discussed above.

Furthermore, the reactor 101 is separated into two separate chambers, a first chamber 101A and a second chamber 101B. The first chamber 101A and the second chamber 101B are separated for example by an internal divider or by a hydraulic gradient.

The reactor 101 can include inlets 160 configured to transfer wastewater flow to the first chamber 101A and/or the second chamber 101B. As shown in FIG. 2, inlets 160 are arranged approximately in the midpoint along the length of the reactor 101 and are arranged such that incoming wastewater flow can be directed to either the first chamber 101A or the second chamber 101B or both the first chamber 101A and the second chamber 101B simultaneously, as discussed herein.

In some embodiments, the base 130 of the reactor 101 includes an aeration system 140, media bed 150 and effluent collectors 170A and 170B, as discussed below. In this embodiment, the aeration system 140 comprises a plurality of aeration diffusers 142 connected to an air or oxygen supply and spaced along the base 130 of the reactor 101. In some embodiments, the aeration system is arranged such that the main aeration headers are accessible at the upper surface of the wastewater. In some embodiments, the aeration lines run perpendicular to the direction of wastewater flow through the reactor 101 although in other embodiments the aeration lines run parallel to the direction of wastewater flow. In some embodiments, the aeration system 140 includes acid cleaning means for cleaning of the diffusers in situ.

In some embodiments, such as shown in FIG. 2, the media bed 150 is placed over the aeration system 140 and may be any suitable material that will have pore spaces for air or oxygen generated by the diffusers 142 at the base 130 of the of the reactor 101 to pass through the material bed 150 so as to aerate the wastewater within the reactor 101. As discussed herein, the media bed 150 may be composed of any suitable material, for example, any material that passes through a 1.5 inch screen such as suitably sized rocks or gravel, although other suitable materials will be readily apparent to one of skill in the art.

As can be seen in FIG. 2, the first chamber 101A has an effluent collector 160A and the second chamber 101B has an effluent collector 160B respectively for the removal of treated wastewater as discussed herein.

As can be seen in FIGS. 1 and 2, the overall direction of wastewater flow is shown with a large arrow. Specifically, in both drawings, wastewater flows away from or downstream from the inlet 70 or 170 to the effluent collector 60 or 160A or 160B. Smaller arrows show specific paths that may be taken by portions of the wastewater while curly arrows show the movement of air or oxygen through the media bed.

As will be appreciated by one of skill in the art, the term "aeration" is used by those of skill in the art and is understood to encompass supplying oxygen to a system in any suitable quantity, for example, as air or as pure oxygen as well as in other suitable forms.

In a SAGR, the media is typically rock although other suitable types of media may be used. The media is stationary and flow is typically passed through the media in a plug flow configuration. While typically the influent point and the effluent point are at opposite ends of the system, in actuality, the influent point and the effluent point must only be a minimum suitable distance between each other.

As will be apparent to one of skill in the art, biomass quantity and type (nitrifying bacteria vs heterotrophic bacteria) may not be uniformly distributed across the media. The SAGR is typically divided into two or more zones, which can be defined by either a physical "wall" or barrier or by use of one or more hydraulic gradients to promote flow into a certain zone or by limiting dissolved oxygen in a certain zone to promote nitrification in a different part of the system that has dissolved oxygen.

As noted above, one example of an MMAGR is an MBBR. In an MBBR, the media is generally of similar density to water, typically plastic or other synthetic materials that are suitable for attached bacterial growth, and is in suspension. Mixing using aeration or mechanical mixers keeps the media circulating throughout the reactor and the entire reactor functions as a completely mixed reactor. Because the water volume/media/biomass volume is homogenous in the reactor, location of the influent and effluent points is not critical. That is, the influent and effluent points can either be separated by distance or can be close together. Typically, biomass will be dispersed across all media in the reactor. Generally, rock is not used in an MBBR because it is too heavy and cannot be kept in suspension by mixing.

As discussed herein, in some embodiments, the MMAGR may be divided into arbitrary zones. For example, according to another aspect of the present disclosure, there is provided a method for aeration or oxygenation or increasing nitrifying bacteria biomass including: in an attached growth reactor including a plurality of media for supporting biomass growth, said reactor comprising at least two zones and each respective zone including at least one oxygen port for receiving air or oxygen and a plurality of aeration or oxygen dispersion ports connected to a respective oxygen port for dispersing air or oxygen into the respective zone, in a warm weather period, supplying air or oxygen to a first respective zone for a first period of time, and then supplying air or oxygen to a second respective zone for a second period of time. As will be appreciated by one of skill in the art, this will promote nitrification within different zones of the reactor which will in turn increase nitrifying bacteria biomass within that zone.

As discussed above, one example of an SMAGR is a stationary fixed film media attached growth reactor. This stationary film does not require energy for suspension. Some examples of stationary fixed film media include but are by no means limited to GE Membrane Aerated Bioreactor (MABR), Entex Webitat fixed film media, and Lemna Polishing Reactor (LPR). While it is not necessary for the media to remain in suspension, full mixing within the reactor is possible. In this case, because of the mixing, influent and effluent locations can vary considerably and, similar to an MBBR, there is no minimum distance requirement. As is the case with the MBBR, physical barriers may be required to have distinct hydraulic zones within the system, as discussed above, although a hydraulic gradient could be used instead, provided the mixing of the suspension is at a suitable level for the hydraulic gradient to function.

As discussed herein, these stationary films that act as bacterial growth supports may be arranged to be connected to an aeration or oxygenation source so that air and/or oxygen can be supplied to the biomass.

As will be appreciated by one of skill in the art, in these embodiments, two or more respective stationary films may include one or more oxygen intake ports for receiving oxygen, either as air or as pure oxygen or some mixture thereof. Furthermore, each respective one of the stationary films may include a plurality of outlet ports for dispersing oxygen through the stationary films and into the interior of the attached growth reactor.

As will be appreciated by one of skill in the art, each stationary fixed media supports bacterial biomass growth thereon and as such each stationary fixed medium can be considered to represent a different zone within a given reactor. Furthermore, by aerating at a respective one or respective group of the fixed stationary media for a first period of time and then aerating at a different respective one or respective group of the fixed stationary media for a second period of time on an alternating basis increases the biomass of nitrifying bacteria within the reactor system, as discussed herein.

As such, the zone(s) that are being aerated changes over time. The end result is that each of the aerated zones grows more nitrifying bacteria biomass during the period of time exposure to oxygen and/or air. However, if aeration at all stationary fixed media was constant or continuous, only the zones closest to the inlet would encounter sufficient nitrogen to support growth of nitrifying bacteria biomass. According to another aspect of the present disclosure, there is provided a method of aeration or oxygenation for increasing nitrifying bacteria biomass within a wastewater treatment system including: in an attached growth reactor including a plurality of stationary fixed media for supporting biomass growth, at least two of said plurality of stationary fixed media including at least one oxygen intake port for receiving air or oxygen and at least one aeration or oxygen dispersion port connected to the respective oxygen intake port for dispersing oxygen into the reactor, connecting the at least two of said plurality of stationary fixed media to an aeration source via the respective at least one oxygen intake port; and supplying air or oxygen to a first one of the at least two of the plurality of stationary fixed media for a first period of time, and then supplying air or oxygen to a second one of the at least two of the plurality of stationary fixed media for a second period of time.

As will be appreciated by one of skill in the art, the supply of air or oxygen to the first respective one of the stationary fixed media ceases or is reduced when air or oxygen is being supplied to the second respective one of the stationary fixed media. However, it is important to note that as used herein "a first respective one of the stationary fixed media for a first period of time, and then supplying air or oxygen to a second respective one of the stationary fixed media for a second period of time" does not exclude both or neither of the first respective one and the second respective one receiving air or oxygen at the same time. As will be apparent, the shorter the overlap time is, the more efficient production of nitrifying bacteria biomass will be because growth of nitrifying bacteria biomass will be promoted in a different zone, that is, in the zone being supplied air or oxygen.

Furthermore, "a first respective one" may refer to a single stationary fixed medium or may refer to a group of stationary fixed media.

Furthermore, it is noted that in embodiments wherein there are more than two stationary fixed medium, one respective stationary fixed media may be receiving oxygen or air at any given time while two or more respective stationary fixed media are not receiving air or oxygen.

The first period of time and the second period of time may be selected from the group consisting of: a few hours; a day; a few days; a week; a few weeks; a month; and a few months.

In some embodiments, each respective zone or each respective one of the stationary fixed media may be connected to the aeration or oxygenation source such that aeration to specific zone or stationary fixed medium can be controlled either individually or in groups. As will be apparent to one of skill in the art, as a result of this arrangement, the aeration at individual zones or stationary fixed medium members can be controlled and regulated. This in turn means that specific nitrification zones or stationary fixed media zones can be created by controlling oxygenation to these sites.

As discussed herein, this represents one method for increasing nitrifying bacteria biomass to a greater extent than would be present under normal circumstances.

In some embodiments, the air applied to the zones may be heated, particularly in cold weather months. As will be appreciated by one of skill in the art, injection of heated air proximal to the nitrifying bacteria biomass will create one or more zones of localized heat within the reactor which will in turn increase the efficiency of the nitrifying bacteria as discussed herein while also increasing oxygenation.

As will be appreciated by one of skill in the art, the temperature to which the air or oxygen is heated will depend on several factors for example but by no means limited to the temperature of the wastewater in the reactor and the amount of air or oxygen being injected. For example, the air or oxygen may be heated to a greater extent if the wastewater temperature is close to 4 degrees Celsius and/or is a relatively small amount of air or oxygen is being injected. However, it is held that optimization of these parameters represents routine experimentation for one of skill in the art.

According to another aspect, there is provided a method of improving ammonia removal from waste water during cold weather including:

in a sewage treatment system including at least one attached growth reactor for treating wastewater, said wastewater being generated for the sewage treatment system and applied to the reactor at an approximately consistent volume and consistent ammonia content previously, increasing the wastewater load by increasing the volume of wastewater and/or the ammonia content applied to the reactor for a period of time, thereby increasing nitrifying bacteria biomass within the reactor.

Preferably, the wastewater volume and/or ammonia content applied is increased during a warm weather period when nitrifying bacteria are capable of active growth.

The wastewater load may be increased by one or more of:
recycling a portion of the effluent wastewater to a location within the sewage treatment system upstream of the reactor;
increasing wastewater flow rate through the reactor compared to standard operations;
reducing treatment efficiency of a portion of the sewage treatment system upstream of the reactor compared to standard operations; or
increasing incoming wastewater volume entering the reactor compared to standard operations.

According to another aspect of the present disclosure, there is provided a method of increasing nitrifying bacteria biomass for improving ammonia removal from wastewater during a cold weather period including: in a sewage treatment system including at least one attached growth reactor for treating wastewater, said wastewater being applied to the reactor at an approximately consistent volume and consistent ammonia content over time, during a warm weather period, the sewage treatment system treating influent wastewater in the reactor and producing effluent wastewater, recycling a portion of the effluent wastewater to a point of the sewage treatment system upstream of the reactor for a second period of time during the warm weather period, thereby increasing carbon and/or ammonia load and increasing nitrifying bacteria biomass in the reactor compared to standard operation of the reactor.

As discussed herein, at the end of the warm weather period, the nitrifying bacteria biomass within one of the growth reactors is estimated and wastewater is transferred to the specific one of the growth reactors according to the estimated nitrifying bacteria biomass within the specific one of the growth reactors for the duration of the cold weather period.

During the cold weather period, the attached growth reactor(s) treating influent wastewater and producing effluent wastewater without recycling effluent wastewater or reducing wastewater recycling upstream. As will be appreciated by one of skill in the art and as discussed herein, the key consideration is if the nitrifying bacteria biomass within a given reactor is capable of treating the influent wastewater during cold weather periods. As such, for example the amount of wastewater being recycled can be reduced but still be increased compared to standard operations, providing that the load of the influent wastewater to a given reactor is still such that the respective reactor can effectively treat the influent wastewater. In some cases, this may be referred to as "without recycling" or "without reduced treatment capacity" but it is to be understood that this does not preclude for example some recycling provided that the degree of recycling is such that the nitrifying bacteria biomass in the specific reactor is capable of nitrifying the influent wastewater.

According to another aspect of the present disclosure, there is provided a method of increasing nitrifying bacteria biomass for improving ammonia removal from wastewater during a cold weather period including: in a sewage treatment system including at least one attached growth reactor for treating wastewater, said wastewater being applied to the reactor at an approximately consistent volume and consistent ammonia content over time, during a first period of the warm weather period, increasing a rate of wastewater flow through the reactor for example by displacing the wastewater containing ammonia using another water source, for example, water from another part of the sewage treatment system including but not limited to effluent from the nitrification reactor or other downstream treatment process to increase the loading in the attached growth reactor.

During cold water, the attached growth reactor(s) treats influent wastewater and produces effluent wastewater without supplementing the flow using an additional water source.

At the end of the warm weather period, the nitrifying bacteria biomass within one of the growth reactors is estimated and wastewater is transferred to the specific one of the growth reactors according to the estimated nitrifying bacteria biomass within the specific one of the growth reactors for during or during at least part of the cold weather period.

According to another aspect of the present disclosure, there is provided a method of increasing nitrifying bacteria biomass for improving ammonia removal from wastewater during a cold weather period including: in a sewage treatment system including at least one attached growth reactor, during a first period of the warm weather period, treating influent wastewater and producing effluent wastewater, during a second period of the warm weather period, wastewater stored within the system is combined with the influent wastewater to increase carbon and/or ammonia load compared to standard operations, thereby increasing nitrifying bacteria biomass.

During the cold weather period, the attached growth reactor(s) treats influent wastewater without the additional stored wastewater or reduced additional wastewater as discussed above and produces effluent treated wastewater.

At the end of the warm weather period, the nitrifying bacteria biomass within one of the growth reactors is estimated and wastewater is transferred to the specific one of the growth reactors according to the estimated nitrifying bacteria biomass within the specific one of the growth reactors during or during a part of the cold weather period.

According to another aspect of the present disclosure, there is provided a method of increasing nitrifying bacteria biomass for improving ammonia removal from wastewater during a cold weather period including: in a sewage treatment system including at least one attached growth reactor for treating wastewater, said wastewater being applied to the reactor at an approximately consistent volume and consistent ammonia content over time, during a first period of the warm weather period, increasing the ammonia content of the waste water for example by reducing the treatment capacity of processes up-front of the attached growth reactor(s), thereby increasing carbon and/or ammonia load and increasing nitrifying bacteria biomass; and during the cold weather period, the attached growth reactor(s) treating influent wastewater and producing effluent wastewater without reduced treatment capacity or with less reduced treatment capacity up-front, as discussed above.

Herein, "to increase carbon and/or ammonia load" is used to describe the reason for chemically or physically increasing the wastewater load to the attached growth reactor(s) during the warm weather period. However, embodiments wherein other chemical or physical means are used to increase the carbon or ammonia load to the attached growth reactor(s) are to be understood as being possible and encompassed in all embodiments.

As will be appreciated by one of skill in the art, these methods increase the amount of carbon and/or ammonia being applied to the reactor. The additional ammonia will promote growth of additional nitrifying bacteria, for example, by creating a larger colony of nitrifying bacteria within the reactor or reactor chamber and/or by promoting the establishment of new colonies of nitrifying bacteria.

In another aspect of the present disclosure, there is provided a method for increasing nitrifying bacteria biomass including:

in an attached growth reactor system including a plurality of stationary fixed media for supporting biomass growth, said attached growth reactor system having an inlet region for accepting wastewater and an outlet region, said wastewater having a direction of flow through the reactor from the inlet region to the outlet region, each respective one of the plurality of stationary fixed media being positioned within the reactor sequentially from the inlet region to the outlet region, periodically removing a respective one stationary fixed medium from a position in sequence that is more proximal to the inlet region and placing said respective one stationary fixed medium in a position in sequence that is more distal to the inlet region.

The attached growth reactor system may be a single attached growth reactor or may be two or more attached growth reactors.

In another aspect of the present disclosure, there is provided a method for increasing nitrifying bacteria biomass including:

in an attached growth reactor system including at least a first attached growth reactor and a second attached growth reactor, each attached growth reactor including a plurality of moving media for supporting biomass growth thereon, the first attached growth reactor having an inlet region for accepting wastewater and the second attached growth reactor having an outlet region, said wastewater having a direction of flow through the attached growth reactor system from the first reactor to the second reactor, periodically removing moving media from the first attached growth reactor and transferring said moving media to the second attached growth reactor.

As will be appreciated by one of skill in the art, moving media from the second reactor may be transferred to the first reactor or moving media may be added to the first attached growth reactor.

As will be appreciated by one of skill in the art, during processing of the wastewater in an attached growth reactor including stationary fixed media, the biomass that feeds on the wastewater grows on the attached media. In the warm weather months, when nitrifying bacteria are most active, the fixed media closest to the inlet will have the greatest biomass. Periodically removing one of the fixed media closest to the inlet region of the attached growth reactor and moving it to a position more distal to the inlet region accomplishes two things: the now more distal fixed medium already has nitrifying bacteria biomass growing thereon which will now become established further downstream of the inlet region and the fixed media that are now more proximal to the inlet region will grow nitrifying bacteria thereon as a result of exposure to more nitrogen as a result of being closer to the inlet. It is to be understood that "more distal" may also refer to movement to a chamber within the reactor or another reactor entirely that is downstream of the initial position of the media within the sewage treatment system.

Similarly, the moving media in the first reactor will comprise nitrifying bacteria biomass. Transferring this moving media to the second reactor transfers the nitrifying bacteria biomass to the second reactor. Replacing the moving media in the first reactor or first chamber of the reactor provides new surface area on which nitrifying bacteria biomass can be established. Thus, by removing the moving media from the first reactor at least once, the nitrifying bacteria biomass in the entire reactor system can be increased.

As will be apparent to one of skill in the art, moving one of the fixed media downstream within the flow of the wastewater increases the nitrifying bacteria biomass. As such, the process can be repeated multiple times during the warm weather months, thereby significantly increasing the nitrifying bacteria biomass within the attached growth reactor compared to an attached growth reactor in which the media are not moved.

The media may be moved after any suitable time period that is sufficient for the nitrifying bacteria biomass to grow to a sufficient extent, for example, after a few days; after a week; after a few weeks; after a month; and after a few months.

As will be apparent to one of skill in the art, other reactor systems having a similar functionality to the SAGR or MBBR system can be considered to be the same as and/or functionally equivalent to the SAGR or MBBR system as used herein.

In some existing systems, a population of nitrifying bacteria is created/maintained downstream of the inlet point in warm weather months so that there are at least two populations of nitrifying bacteria within the reactor during cold weather months.

In some such systems, while the volume of wastewater entering the reactor remains constant, the location at which the wastewater is added to the reactor changes.

As used herein, "constant volume" or "consistent volume" does not necessarily mean "identical". The variation in levels of wastewater entering treatment systems over time are well understood by those knowledgeable in the art in general as well as specifically for individual treatment systems. As discussed herein, for example, predicted volumes and/or load can be determined based on for example predicted usage patterns, as discussed herein. Rather, as used herein, "constant volume" or "consistent volume" in regards incoming wastewater to be treated in the attached growth reactor system takes into account these expected variations and refers to "all" of the wastewater being applied to the attached growth reactor system at a given time. That is, as discussed herein, a predicted or projected volume or load, also referred to as an approximately constant or consistent volume of wastewater or wastewater load is expected or projected to be administered to the sewage treatment system. Similarly, the wastewater is expected to have similar or consistent or constant carbon and/or ammonia content or concentration over time. For example, it may be predicted to be approximately equivalent to what was generated previously or may be based on projections of expected usage based on the size and nature of the group or population using the sewage treatment system.

In various embodiments of the present disclosure, the influent may be transferred disproportionally to the members of the attached growth reactor system. That is, at any given point in time, one attached growth reactor or chamber within an attached growth reactor may receive a significant amount of the incoming volume of the influent. In embodiments wherein there are two attached growth reactors within the attached growth reactor system, the first reactor may receive greater than 50%, greater than 60%, greater than 70%, greater than 80%, greater than 85%, greater than 90%, greater than 95%, substantially all or all of the influent while the second attached growth reactor receives less than 50%, less than 40%, less than 30%, less than 20%, less than 15%, less than 10%, less than 5%, substantially none or none of the influent for a first period of time. Subsequently, this is reversed, so that the second attached growth reactor receives a greater portion of the incoming wastewater volume for a second period of time. This process of alternating which attached growth reactor(s) receives more of the incoming wastewater volume is repeated throughout the warm weather months, as discussed herein.

Figure 3:
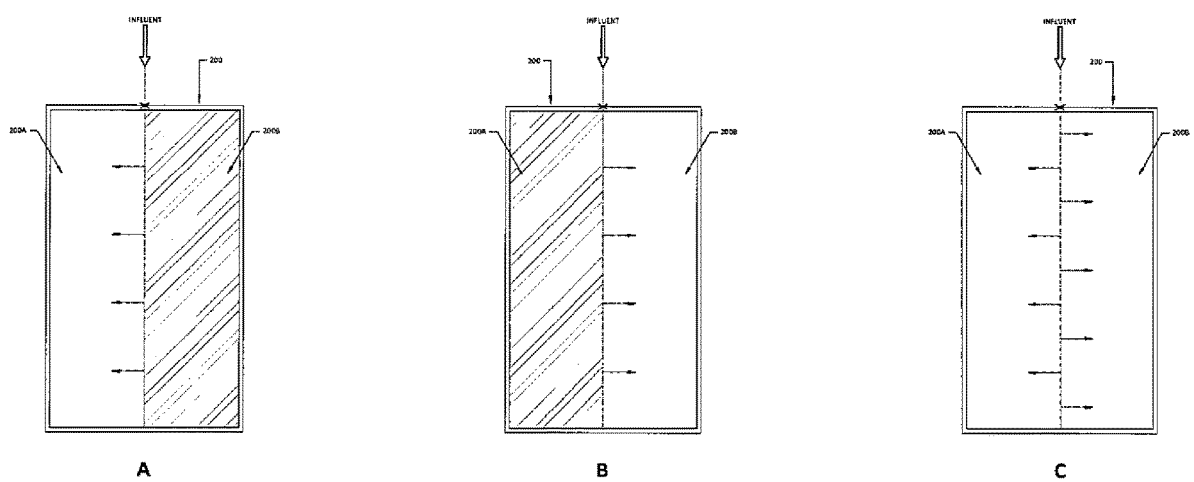
FIG. 3 is a schematic drawing illustrating an embodiment of a sewage treatment system in which application of wastewater to the reactors is varied over time.

Referring now to FIG. 3, a reactor 200 is shown according to an embodiment of the present disclosure. The reactor 200 can incorporate features of the reactors 1, 2, and/or 100, and can implement the disproportionate wastewater flow functions described herein. In some embodiments, the reactor 200 includes a first reactor 200A and a second reactor 200B. In a first mode of operation, such as shown in panel A of FIG. 3, for a first period of time, 100% of the constant volume of the wastewater is delivered or applied or transferred to the first reactor 200A and 0% of the constant volume is transferred to the second reactor 200B. After the first period of time has expired, 0% of the wastewater is transferred to reactor 200A while 100% is transferred to reactor 200B for a second period of time, as shown in panel B of FIG. 3. In some embodiments, following expiration of the second period of time, the process is repeated, that is, 100% of the wastewater is transferred to reactor 200A for a first period of time and then 100% of the wastewater is transferred to the second reactor 200B for a second period of time. This process may be repeated, that is, alternated, during warm weather. During cold weather, the wastewater is distributed approximately equally between the first reactor 200A and the second reactor 200B, as shown in panel C of FIG. 3. It is important to note that not only do the respective first period(s) of time and the second period(s) of time not have to be identical, the "first" first period of time and the "second" first period of time do not have to be identical either.

As such, these embodiments of the present disclosure enable the volume of wastewater entering the reactor system to remain constant or consistent over time, while the volume of wastewater transferred to each reactor within the reactor system varies over time.

For attached growth reactor systems including more than 2 attached growth reactors, for example, "n" attached growth reactors wherein "n" is an integer of greater than 2, for example, 3, 4, 5, 6, 7, 8, 9, 10 or more, a greater portion of the incoming wastewater volume is transferred to a respective one or more of the n attached growth reactors for a period of time while the volume transferred to the remaining attached growth reactors is reduced accordingly. The respective one of the attached growth reactors receiving the additional volume of wastewater, for example, 120% of "normal" volume, wherein the normal volume is the amount that that specific attached growth reactor would receive is the incoming volume was divided equally amongst all of the attached growth reactors.

As will be appreciated by one of skill in the art, the unequal distribution of the incoming wastewater volume increases the biomass in a given attached growth reactor. While not wishing to be bound to a specific theory or hypothesis, additional biomass growth in each reactor is expected to be approximately proportional to the additional flow that each reactor receives.

For example:

If B is the quantity of biomass, expressed as a % of the biomass normally occurring in the reactor;

N is the total number of reactors; and

R is the number of reactors receiving loading during the bypass of the remaining reactors, the total biomass is expected to be estimated by the following relationship:

$$B=100\% \times N/R.$$

For example, 10 total reactors, with 4 reactors being bypassed and 6 receiving wastewater would result in 100%× 10/6=166% of the biomass in each cell or chamber compared to a situation in which all reactors remaining in service.

For a two reactor system, bypassing one cell would result in 100%×2/1=200% of the biomass compared to both reactors remaining in service continuously, that is, both reactors receiving the same amount of wastewater.

Once the period of time that this "respective one" attached growth reactor receives the increased volume has expired, a "respective second one" attached growth reactor in the attached growth reactor system receives the increased volume and the previous "respective first one" attached growth reactor receives a lower volume as do the remaining attached growth reactor members of the attached growth reactor system for a second period of time. This process of alternating which reactor receives more influent or volume or intakes more wastewater may be repeated over time, as discussed herein.

As a result, the biomass in the respective second one attached growth reactor begins to increase due to the increase in applied wastewater at the start of the second period of time. However, the nitrifying bacteria biomass in the respective first one attached growth reactor does not change significantly during the second period of time despite the reduction in applied wastewater, although it is hypothesized that the amount of heterotrophic bacteria in the respective first one attached growth reactor decreases as a result of the decreased volume of wastewater being transferred during the second period of time.

As such, by changing or alternating which attached growth reactor receives the intervention, for example, the increased volume of incoming wastewater during the warm weather months, the biomass of nitrifying bacteria in each respective attached growth reactor is increased, as discussed herein. Other methods of increasing nitrifying bacteria biomass are disclosed herein and are within the scope of the present disclosure.

Thus, as discussed herein, during the warm weather periods of time (e.g., warm weather months), wastewater is distributed unequally between the two or more attached growth reactors or chambers within a single attached growth reactor on an alternating basis for the establishment of nitrifying bacteria biomass within the attached growth reactors. However, by temporarily distributing more wastewater to one reactor for a period of time and then alternating which reactor receives more wastewater, for example, substantially all or all of the incoming volume, the nitrifying bacteria biomass in each reactor is increased compared to applying a constant volume of wastewater to each reactor, as discussed herein.

For example, in an attached growth reactor system including two attached growth reactors wherein during warm weather months, all (or substantially all) of the incoming wastewater volume is transferred to one attached growth reactor for a period of time, then all is transferred to the other attached growth reactor for a period of time. This alternating between which attached growth reactor receives a significant portion for example all of the wastewater may be repeated as often as necessary during the warm weather months based on the length of the period of time selected. As a result of this arrangement, the amount of nitrifying bacteria biomass present in each attached growth reactor will be approximately 200% of what it would have been had each attached growth reactor been transferred a "normal" volume of incoming wastewater, that is, approximately half of the incoming wastewater volume continuously or constantly during the warm weather periods of time. The nitrifying bacteria are able to treat the incoming wastewater during the cold weather months despite the fact that cold weather reduces the efficiency of the nitrifying bacteria because of the increased biomass. Furthermore, for example, the first period of time and the second period of time may be identical but do not necessarily need to be identical or even similar. Furthermore, when alternating between reactors, the "first" first period of time and the "second" first period of time do not necessarily need to be the same every time. That is, initially the first period of time may be for example 1 month, then 2 weeks, then 6 weeks.

As will be appreciated by one of skill in the art, an attached growth reactor system including two attached growth reactors, each one getting all or nothing of the incoming wastewater volume on an alternating basis during the warm weather months and half of the incoming wastewater volume during the cold weather months represents the simplest situation and is accordingly used herein for illustrative purposes.

In other embodiments, encompassed within the scope of the present disclosure, it may be that incoming volume is split 80/20 on an alternating basis between two attached growth reactors. This would result in an increase in biomass of 180% in each reactor.

In some embodiments, the volume transferred to each attached growth reactor during the cold weather months may be approximately proportional to the percentage of the total nitrifying bacteria biomass present in each attached growth reactor or proportional to or suitable for the nitrifying bacteria biomass in a given reactor, as discussed herein. That is, if the increased volume that is applied to each individual attached growth reactor is different, the amount of biomass in each reactor will also be different. In other words, the nitrifying bacteria biomass within a given reactor or reactor chamber may be estimated based either on the transfer of wastewater or on the capacity of a given reactor or reactor chamber to nitrify wastewater. This capacity may be measured using means known in the art, for example, by characterizing the ammonia content of wastewater influent entering the reactor and effluent exiting the reactor, or by the nitrite and nitrate produced within the reactor. As such, the volume transferred during the cold weather months may be adjusted accordingly for optimum functioning of the reactor system, although it is important to note that the reactor system will still be effective even if this is not done.

As will be apparent to one of skill in the art, the wastewater may be distributed to the attached growth reactors by a variety of means, as discussed herein. In some embodiments, wherein the attached growth reactor system comprises one attached growth reactor divided into two chambers, the chambers may be fed from the center out to the edges so that the inlets for each chamber are on either side of the central or common or shared distribution point. However, for simplicity, these two chambers will be referred to as a first attached growth reactor and a second attached growth reactor herein.

As will be apparent, there are those in the art who would consider multiple attached growth reactors to be functionally equivalent to one attached growth reactor having a volume equal to the combined volumes of the multiple attached growth reactors. These individuals would also conclude that one chamber of an attached growth reactor including multiple chambers or an attached growth reactor system including two or more attached growth reactors could be arbitrarily designated as being "upstream" within the attached growth reactor system while the other(s) are "downstream" within the attached growth reactor system.

For example, when the attached growth reactor is a SAGR, the SAGR system is arranged such that either all of the wastewater can be distributed to either SAGR or portions of the influent can be distributed to each SAGR simultaneously. As will be apparent by one of skill in the art, this can be accomplished by a number of means, either by having two separate influent wastewater distribution systems for each SAGR or wherein the two SAGRs are effectively separate chambers of one SAGR with a central influent distribution point, distribution could be controlled by effluent valves in either SAGR so that influent enters the SAGR chamber with the lowest hydraulic gradient.

Alternatively, in embodiments wherein the attached growth reactor is an MMAGR or a SMAGR arranged in an attached growth reactor system wherein there are two or more physically separate attached growth reactors, for example, two or more MBBRs or fixed film reactors or a single MBBR or fixed film attached growth reactor separated into two or more chambers operated in parallel, split feed can be used to create larger nitrifying colonies in different reactors. Specifically, the biomass of nitrifying bacteria in the second reactor can be increased by fully or partially bypassing the first reactor for a period of time, as discussed herein. In some embodiments, as discussed herein, which reactor is bypassed is alternated after a period of time.

Other methods such as reducing aeration in the first reactor to generate nitrifying bacteria in the second reactor, which would be fully aerated, would have the same effect as bypassing the first reactor entirely as all ammonia will pass through the unaerated zone with minimal reduction.

Thus, two or more MMAGR or SMAGR reactors can be operated in parallel. By alternately feeding the parallel reactors for a period of time, additional biomass is grown in each, allowing the system to nitrify wastewater in the cold weather periods of time by again splitting the flow approximately equally between the parallel cells. That is, as discussed above, with N attached growth reactors, whether SAGR or MBBR or SMAGR reactors, in an attached growth reactor system connected in parallel, any intervention increasing nitrifying bacteria biomass, for example, transferring n×y % of the "normal" incoming wastewater volume to each one of the attached growth reactors for a period of time where "normal" would be the amount of volume transferred if all members of the system received a proportionate amount and y is greater than 100, the biomass in each respective attached growth reactor will be increased by y %. As will be appreciated by one of skill in the art, this represents one method for estimating nitrifying bacteria biomass volume or quantity.

In an alternative embodiment, there is provided an attached growth reactor system that has a first end region and a second end region, each end region having an access port. As will be appreciated by one of skill in the art, as a result of this arrangement, the flow can effectively be reversed in the attached growth reactor periodically. As a result of this arrangement, two populations of nitrifying bacteria can be formed, each proximal to one end region of the attached growth reactor system.

According to an aspect of the present disclosure, there is provided a method for increasing nitrifying bacteria biomass in an attached growth reactor including:

providing an attached growth reactor system having a first end region and a second end region wherein the first end region and the second end region are both capable of acting as an inlet or an outlet;

during a warm weather period of time, transferring a volume of wastewater into the attached growth reactor system at the first end region and removing treated wastewater from the attached growth reactor system at the second end region for a first period of the warm weather period, then transferring the volume of wastewater into the attached growth reactor system via the second end region and removing treated wastewater from the attached growth reactor system at the first end region for a second period of the warm weather period on an alternating basis.

As will be apparent to one of skill in the art, the nitrifying bacteria biomass present in the attached growth reactor has been effectively doubled as a result of alternating the direction of flow through the reactor.

The direction of flow can be changed after any suitable period, for example, after a period of time selected from the group consisting of: a few hours; a day; a few days; a week; a few weeks; a month; and a few months.

The attached growth reactor system may be a single attached growth reactor wherein either end of the single reactor can act as inlet or outlet, or the attached growth reactor system may be at least two attached growth reactors, wherein a first attached growth reactor is the first end of the system and the second attached growth reactor is the second end of the system.

In the embodiments discussed herein, in warm weather periods of time, a significant portion or substantially all of the influent is transferred to the first attached growth reactor, for example, a SAGR, an MMAGR or a SMAGR, for a period of time to increase the biomass, for example, the nitrifying bacteria biomass, in the specific attached growth reactor. Following this period of time, which must be long enough for the nitrifying bacteria biomass to increase and may be for example half an hour, an hour, a few hours, half a day, a day, a few days, a week, a few weeks, a month or even a few months, a significant portion or substantially all of the wastewater is transferred to the second attached growth reactor so as to support bacterial growth and maintain the bacteria population within the second attached growth reactor.

As will be appreciated by one of skill in the art, wastewater volumes applied to the attached growth reactor system stay approximately constant throughout the year. However, the ability of the bacteria population to break down the influent as discussed herein is reduced during the cold weather months.

Consequently, in the cold weather periods of time, when water temperature may decrease towards or be lower than 4 degrees Celsius, the incoming wastewater is divided such that a portion thereof, for example, approximately half, is transferred to the first attached growth reactor and the remainder is transferred to the second attached growth reactor.

That is, during the warm weather periods of time, which reactor receives an increased proportion or substantially all of the incoming volume is alternated so that the nitrifying bacteria biomass in each reactor is proportionally increased; however, during the cold weather months, each reactor receives an approximately constant proportion of the incoming volume which is effectively nitrified by the increased nitrifying bacteria biomass in each reactor.

Alternatively, as discussed herein, the division of the incoming volume or incoming flow or flow may be based on the relative amount of biomass in each attached growth reactor in the attached growth reactor system, calculated or estimated or approximated as discussed herein.

Specifically, by distributing the wastewater unequally to two (or more) attached growth reactors throughout the warm weather months, and alternating which attached growth reactor received more (or all) of the incoming volume over time, the biomass for example the biomass of nitrifying bacteria in each reactor is increased proportionally to the increase in flow. Consequently, in the cold weather months, when the efficiency of bacterial degradation of the influent is decreased, there is increased biomass of nitrifying bacteria to treat the influent.

According to another aspect of the present disclosure, there is provided a method of improving ammonia removal from waste water during cold weather months including:

in a sewage treatment system including at least two attached growth reactors, each respective attached growth reactor having an inlet distribution point in the attached growth reactor for receiving an influent of wastewater, transferring an approximately constant volume of the wastewater to the two attached growth reactors, wherein the volume is transferred such that a first attached growth reactor receives a larger portion of the volume than a second attached growth reactor for a first period of time and the second attached growth reactor receives a larger portion of the volume than the first attached growth reactor for a second period of time during a warm weather period; and transferring the volume of wastewater to the first attached growth reactor and the second attached growth reactor approximately equally during a cold weather period.

According to another aspect of the present disclosure, there is provided a method of increasing nitrifying bacteria biomass in an attached growth reactor system during a warm weather period including:

in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of time of the warm weather period and the second attached growth reactor receives a larger portion of the volume than the first attached growth reactor for a second period of time of the warm weather period on an alternating basis.

As discussed herein, "alternating basis" refers to the fact that once the second period of time has expired, the first attached growth reactor receives the larger portion of the volume for a "new" first period of time.

It is further noted as used herein that the biomass of the nitrifying bacteria in the attached growth reactor system is increased compared to the nitrifying biomass present in a control attached growth reactor system, that is, a growth reactor system of similar size, fed a similar type of wastewater. That is, the control for comparison purposes would lack the modification(s) or alteration(s) made to the attached growth reactor system to increase the biomass as described herein, for example, alternating flow volumes between reactors, applying nitrogen, applying heat as well as other methods discussed herein.

According to another aspect of the present disclosure, there is provided a method for improving ammonia removal from wastewater during a cold weather period including:

in a sewage treatment system including an attached growth reactor separated into at least a first attached growth reactor chamber and a second attached growth reactor chamber, during a warm weather period, transferring a significant portion of wastewater to the first attached growth reactor chamber for a first period of time, then transferring a significant portion of the wastewater to the second attached growth reactor chamber for a second period of time; and during a cold weather period, transferring approximately half of the wastewater to the first attached growth reactor chamber and approximately half of the wastewater to the second attached growth reactor chamber.

In some embodiments, during the warm weather period, substantially all of the wastewater is transferred to the first attached growth reactor for a first period of time and subsequently all of the wastewater is transferred to the second attached growth reactor for a second period of time.

It is known in the art that the discharge of elevated levels of ammonia during winter months from a sewage treatment lagoon is due to the temperature effects.

The inventors realized that increasing the biomass of nitrifying bacteria within the attached growth reactor system during the warm weather periods by alternating which attached growth reactor receives an increased volume of incoming wastewater and/or increased carbon and/or ammonia content, regardless of whether the attached growth reactor is a SAGR, an MMAGR, a SMAGR or other similar reactor, provides higher levels of nitrifying bacteria biomass within the attached growth reactor system than maintaining a constant distribution to each respective attached growth reactor. The end result is that the nitrifying bacteria biomass is then better able to nitrify the incoming influent volume in the winter months because the greater biomass compensates for the reduction in activity and/or efficiency caused by the cold weather.

The attached growth reactors are supplied wastewater from a treatment lagoon or other similar secondary treatment system. In general, such a lagoon is considered likely to produce wastewater that has low amounts of CBOD in the summer months and high levels of CBOD in the winter months and high levels of ammonia in the winter, low levels of ammonia in the summer. However, as will be known to those of skill in the art, this can vary considerably depending on the nature of the wastewater entering the lagoon as well as other environmental factors such as weather conditions and environmental conditions.

In winter or cold weather, when the cold water temperatures cause the nitrifying microbes to slow-down, the increased biomass allows for the removal of the full amount of ammonia. This is important, because the populations do not respond quickly at very low temperatures, taking a long time to grow a larger bacterial population if there are not enough bacteria for current conditions, which may not be a sufficient response time depending on regulatory permit requirements.

Systems and methods in accordance with present disclosure can facilitate the unequal distribution of the incoming wastewater volume to each attached growth reactor (e.g., staggered supply), which increases the nitrifying bacteria biomass in each reactor compared to a constant distribution of proportional amounts of incoming wastewater volume to each attached growth reactor in the attached growth reactor system. As a result of this arrangement, the reactors contain many more nitrifying microbes than could be grown in a single-feed system. As a consequence, the associated microbial community is capable of doing full treatment even as biological kinetics slow down due to temperature effects.

It is of note that there are other methods for creating one or more additional zones and/or increasing the biomass of nitrifying bacteria within a reactor or reactor system so that there is sufficient nitrifying bacteria population for waste water nitrification during winter months, many of which are discussed herein and which are within the scope of the present disclosure.

In other embodiments, nitrifying bacteria biomass may be increased by altering the environment in a specific zone of an attached growth reactor within an attached growth reactor system. For example, the relative heat, oxygen level and/or ammonia level in a specific zone may be increased as a means for increasing either the activity or the biomass of the nitrifying bacteria, as discussed in greater detail above.

For example, heating means may be employed to elevate the temperature of at least a portion of the waste in the reactor during winter months. For example, the heating means may be arranged such that a region of the reactor expected to contain the nitrification zone is heated, then alternating which zone is heated so that a different region of the reactor is heated, thereby growing nitrifying bacteria biomass in a different region of the reactor.

As will be appreciated by one of skill in the art, there are many means for locally increasing the temperature of a liquid.

Alternatively, oxygen may be supplied to one or more discrete zones of the reactor so as to promote nitrification within those zones. In this case oxygen may be limited in portions of the reactor to grow a larger population of nitrifying bacteria only in the oxygenated portion. For example, supplying heated air or oxygen during cold weather months will increase the local water temperature surrounding the nitrifying bacteria, thereby increasing their activity.

In other embodiments, the waste in the reactor may be supplemented with an alternate source of ammonia at discrete locations within the reactor to support nitrifying bacteria growth, thereby increasing the biomass of nitrifying bacteria. In both instances, the location of heating or ammonia supplementation may be varied over time, thereby establishing multiple colonies or "locations" of nitrifying bacteria.

As can be seen, the processes described herein either increase the activity of the nitrifying bacteria in cold weather months or increase the biomass of the nitrifying bacteria within the attached growth reactor system so that more nitrifying bacteria are available for nitrification. The biomass can be increased by supplying wastewater containing nitrogen or simply nitrogen to a different location within the attached growth reactor system than the original wastewater inlet or by temporarily increasing the amount of nitrogen applied to an inlet, either by temporarily increasing the incoming flow of wastewater to a specific attached growth reactor or by increasing the amount of nitrogen present in the wastewater temporarily by supplementing the wastewater with nitrogen.

As will be appreciated by one of skill in the art, methods such as those described above may be used within a single reactor or reactor system or multiple reactor system, such as those discussed herein.

Influent into the SAGR is typically an effluent from a standard municipal treatment lagoon, having estimated concentrations of CBODS 20-40 mg/l; total suspended solids (TSS) 20-40 mg/l; and ammonia of approximately 25-45 mg/l. However the SAGR is not limited to treating effluent from a lagoon process. The process is applicable to any other nitrification applications where low water temperature conditions are present.

The length of the SAGR is typically 40-75 ft long with a depth of between 4-12 ft. The width of the SAGR will vary as a function of flow. For example, more flow from a larger population base will result in a wider system. Retention time of the wastewater in the SAGR is a function of wastewater concentration, but is typically in the range of 4-6 days, but will vary according to the mass load applied to the SAGR).

Influent into the lagoon will typically be raw municipal wastewater, CBOD 150-250 mg/l; TSS 20-40 mg/l; total Kjeldahl Nitrogen (TKN) 25-45 mg/l; ammonia 20-40 mg/l; and total phosphorus 6-8 mg/l.

A treatment lagoon will typically have a depth between 5 and 20 ft and will typically have somewhere between 20 and 45 days of retention time for the wastewater. The volume of the lagoons depends on the population base feeding the lagoon.

It is important to note that the above stated dimensions for the lagoon and the reactor and the characteristics of the influents are intended for illustrative purpose only.

CBOD removal is typically measured at 20 degrees Celsius, and factored down using a first order equation, resulting in a removal rate at 0.5 degrees Celsius that is approximately half of the rate at 20 degrees Celsius. However, a lagoon may still remove a significant amount of CBOD at these low temperatures, because it may have had more retention time available than was required at the warm temperatures. (All water temperatures). It is of note that 0.5 degrees Celsius is generally accepted as the minimum temperature for a treatment system because at lower temperatures, ice will form.

The scope of the claims should not be limited by the preferred embodiments set forth in the examples but should be given the broadest interpretation consistent with the description as a whole.

The invention claimed is:

1. A method of increasing nitrifying bacteria biomass for improving ammonia removal from waste water during cold weather including:
   in a sewage treatment system including at least one attached growth reactor for treating wastewater, said wastewater having a predicted volume and/or ammonia content under standard operations, during a warm weather period, increasing the wastewater load by increasing the volume of wastewater applied to the at least one attached growth reactor for a period of time compared to the wastewater load under standard operations, thereby increasing nitrifying bacteria biomass within the at least one attached growth reactor, wherein the wastewater load is increased by one or more of:

(a) recycling a portion of effluent wastewater to a location within the sewage treatment system upstream of the at least one attached growth reactor and during the cold weather period, the at least one attached growth reactor treating influent wastewater and producing effluent wastewater without recycling effluent wastewater upstream;

(b) increasing wastewater flow rate through the at least one attached growth reactor by combining: stored wastewater or effluent from a nitrification reactor or another treatment process downstream of the at least one attached growth reactor with the predicted volume of wastewater applied to the at least one attached growth reactor under standard operations;

(c) reducing treatment efficiency of a portion of the sewage treatment system upstream of the at least one attached growth reactor, thereby increasing the ammonia content of the wastewater entering the at least one attached growth reactor; or (d) increasing influent wastewater volume entering the at least one attached growth reactor by combining: stored wastewater or effluent from a nitrification reactor or another treatment process downstream of the at least one attached growth reactor with the predicted volume of wastewater applied to the at least one attached growth reactor under standard operations.

2. The method according to claim 1 wherein at the end of the warm weather period, measuring the nitrifying capacity within the at least one attached growth reactor by measuring the amount of ammonia entering and exiting the at least one attached growth reactor and transferring a quantity of wastewater that the at least one attached growth reactor is capable of treating according to the measured nitrifying capacity within the at least one attached growth reactor for a cold weather period.

3. A method of improving ammonia removal from waste water during a cold weather period including: in a sewage treatment system including at least two attached growth reactors, each respective attached growth reactor receiving an influent of wastewater, transferring a volume of the wastewater to the two attached growth reactors, wherein the volume is transferred such that a first attached growth reactor receives a larger portion of the volume than a second attached growth reactor for a first period of a warm weather period and the second attached growth reactor receives a larger portion of the volume than the first attached growth reactor for a second period of the warm weather period on an alternating basis, said first attached growth reactor and second attached growth reactor being connected in parallel during the warm weather period; and, during a cold weather period, said first attached growth reactor and said second attached growth reactor being connected in series and transferring the volume of wastewater to the first attached growth reactor, recovering effluent from the first attached growth reactor and transferring the effluent from the first attached growth reactor to the second attached growth reactor.

4. A method of increasing nitrifying bacteria biomass improving ammonia removal from waste water during cold weather including:

in a sewage treatment system comprising a first attached growth reactor and a second attached growth reactor for treating wastewater, said first attached growth reactor and said second attached growth reactor being connected in parallel, said wastewater being applied to the reactor at an approximately consistent volume and consistent ammonia content over time, during a warm weather period, transferring a significant portion of wastewater to the first attached growth reactor for a first period of the warm weather period, then transferring a significant portion of the wastewater to the second attached growth reactor for a second period of the warm weather period.

5. The method according to claim 4 wherein at the end of the warm weather period, measuring the nitrifying capacity within the first attached growth reactor or the second attached growth reactor by measuring the amount of ammonia entering and exiting the at least one attached growth reactor and transferring a quantity of wastewater that the at least attached one growth reactor is capable of treating according to the measured nitrifying capacity within the first attached growth reactor or the second attached growth reactor for a cold weather period.

6. The method according to claim 4 wherein the first attached growth reactor and the second attached growth reactor each include an outlet for releasing treated wastewater or effluent and a flow control device, wherein the flow control device is coupled to the outlet of the first reactor and to the outlet of the second reactor and the flow control device is configured to operate in a first mode of operation during a first period of time, a second mode of operation during a second period of time and a third mode of operation during a third period of time, such that:

in the first mode of operation, the flow control device is configured to prevent effluent or treated wastewater from exiting the system via the outlet of the first reactor while permitting exit of treated wastewater from the outlet of the second reactor;

in the second mode of operation, the flow control device is configured to prevent effluent or treated wastewater from exiting the outlet of the second reactor while permitting exit of effluent from the outlet of the first reactor; and in the third mode of operation, the flow control device is configured to permit exit of effluent from the outlet of the first reactor and the outlet of the second reactor.

7. A method for aeration or oxygenation or increasing nitrifying bacteria biomass including: in a single attached growth reactor including a plurality of media for supporting biomass growth, said single attached growth reactor having an inlet region for accepting wastewater and an outlet region, said single attached growth reactor configured such that wastewater has a direction of flow through the single attached growth reactor from the inlet region to the outlet region, said single attached growth reactor comprising at least two zones and each respective zone in the single attached growth reactor including at least one oxygen port for receiving air or oxygen and a plurality of aeration or oxygen dispersion ports connected to a respective oxygen port for dispersing air or oxygen into the respective zone, in a warm weather period, changing which respective zone is aerated by supplying air or oxygen to a first respective zone for a first period of time and generating a first nitrifying bacteria biomass in the first respective zone of the single attached growth reactor, and then supplying air or oxygen to a second respective zone while reducing air or oxygen supplied to the first zone to an extent such that ammonia passes from the first respective zone to the second respective zone for a second period of time and generating a second nitrifying bacteria biomass in the second respective zone of the single attached growth reactor.

8. The method according to claim 7 wherein at the end of the warm weather period, measuring the nitrifying capacity within the single attached growth reactor by measuring the amount of ammonia entering and exiting the single attached growth reactor and transferring a quantity of wastewater that the single attached growth reactor is capable of treating according to the measured nitrifying capacity within the single attached growth reactor for a cold weather period.

9. The method according to claim 7 wherein heated air is supplied to the respective zones.

* * * * *